United States Patent [19]

Maurice

[11] Patent Number: 5,311,416
[45] Date of Patent: May 10, 1994

[54] CASING WITH FLEXIBLE FIXING RING

[75] Inventor: Alain Maurice, Gieres, France

[73] Assignee: Zedel, Crolles, France

[21] Appl. No.: 999,402

[22] Filed: Dec. 31, 1992

[30] Foreign Application Priority Data

Jan. 14, 1992 [FR] France ................................ 92 00382

[51] Int. Cl.⁵ ............................................. F21M 1/00
[52] U.S. Cl. ..................................... 362/362; 362/457;
215/276; 220/319
[58] Field of Search ............... 362/186, 189, 158, 200,
362/202, 208, 362, 457; 215/274, 276; 220/308,
319, 320; 292/256.6, 256.63

[56] References Cited

U.S. PATENT DOCUMENTS

| 1,852,348 | 4/1932 | Hogan et al. | 220/319 |
|---|---|---|---|
| 1,934,214 | 11/1933 | Stimson | 362/208 |
| 2,599,254 | 6/1952 | Gits et al. | 362/208 |
| 3,121,508 | 2/1964 | Kase | 220/319 |
| 3,331,528 | 7/1967 | Racek | 220/319 |
| 4,345,691 | 8/1982 | Burke | 215/274 |
| 4,721,219 | 1/1988 | Dullabaun et al. | 215/274 |
| 5,165,782 | 11/1992 | Maglica et al. | 362/457 |
| 5,197,617 | 3/1993 | Edwards | 215/274 |

FOREIGN PATENT DOCUMENTS 0326420 8/1989 European Pat. Off. .
2211924 7/1989 United Kingdom ................ 362/202

Primary Examiner—Ira S. Lazarus
Assistant Examiner—Alan B. Cariaso
Attorney, Agent, or Firm—Stevens, Davis, Miller & Mosher

[57] ABSTRACT

A casing made of molded plastic material comprises a rigid body with an end part of non-circular cross-section, a closing cover coming into engagement against the end part, and a fixing ring screwed onto a male thread of the body to ensure that the cover is held against the end part. The ring is formed by a flexible part having a cylindrical initial shape, and comprising a plurality of serrations allowing elastic deformation for the female thread of the ring to fit the male thread of the rigid body.

9 Claims, 9 Drawing Sheets

CASING WITH FLEXIBLE FIXING RING

BACKGROUND OF THE INVENTION

The invention relates to a casing made of molded plastic material, comprising:
- a rigid hollow body having a back panel and a side wall of revolution equipped with an end part located opposite the back panel,
- a closing cover coming into engagement against the end part,
- a male first thread arranged along the external surface of the side wall of the body,
- and a fixing ring having a female third thread designed to be screwed onto the male first thread to ensure that the cover is held stably against the end part.

Domestic lighting lamps generally have a cylindrical end part, and the transparent window is fixed onto the end part by means of a ring with internal threading. The transparent window or screen can be a separate part or be integrated into the ring, which is of cylindrical shape. This type of lighting lamp comprises a single electric bulb supported by a holder fixed to a parabolic reflector, located coaxially with respect to the casing.

Some lighting lamps for industry comprise a double focusing system using two electrical bulbs and two reflectors arranged side by side. Incorporating this system in a cylindrical casing means that large dimensions are required, which is incompatible for the use of headsets, which are worn on the user's head.

Reducing the dimensions of the casing requires a modification of the rigid body, for example by replacing the circular cross-section of the end part and associated cover by a non-circular shape. The use of a screw ring with a rigid structure is however impossible to provide closing of the casing.

A first object of the invention consists in achieving a casing of non-circular cross-section sealed by a tightening ring.

A second object of the invention consists in achieving a sealing system in a non-circular casing.

SUMMARY OF THE INVENTION

The casing according to the invention is characterized in that the end part of the body has a non-circular cross-section, notably oval or ellipsoid, that the cover is provided with a base part with a cross-section appreciably the same as that of the end part, that the ring is made by plastic injection of a flexible part having a cylindrical initial shape, and that the wall of said part comprises a plurality of serrations extending transversely with respect to the female third thread, in such a way as to define a first series of zones with reduced sections forming hinges angularly imbricated between a second series of zones with rigid sections, the presence of the serrations allowing an elastic deformation of the ring to make the shape of the female third thread fit that of the male first thread of the rigid body.

Tightness of the casing is obtained by means of a shoulder of the end part designed to receive a seal following the shape of the end part exactly. The rear part of the base part comprises a bearing edge coming into contact with the seal, the edge being located between an upper overlapping tab and an internal centering surface cooperating respectively with conjugate positioning faces bounding said shoulder of the end part.

According to one feature of the invention, the rear part of the ring cooperates at the end of tightening travel with a boss fixedly secured to the body, the boss being arranged to perform rear centering of the ring, and to prevent any foreign bodies from getting into the threads.

According to another feature of the invention, the external lateral surface of the base part comprises a male second thread cooperating with the female third thread so as to achieve captive assembly of the cover on the ring when unscrewing is performed.

The mean perimeter of the first or third thread is slightly greater than that of the second thread. This results in the base part of the cover being assembled with clearance on the ring.

The plastic casing according to the invention can be used in all fields of the technique. It is particularly advantageous to make use of it in the field of electricity, notably for electric lighting. In the case of a lighting lamp, the cover is replaced by a transparent window or screen.

BRIEF DESCRIPTION OF THE DRAWINGS

Other advantages and features will become more clearly apparent from the following description of two illustrative embodiments of the invention, given as non-restrictive examples only and represented in the accompanying drawings, in which.

DESCRIPTION OF THE PREFERRED EMBODIMENT

Figure 1:
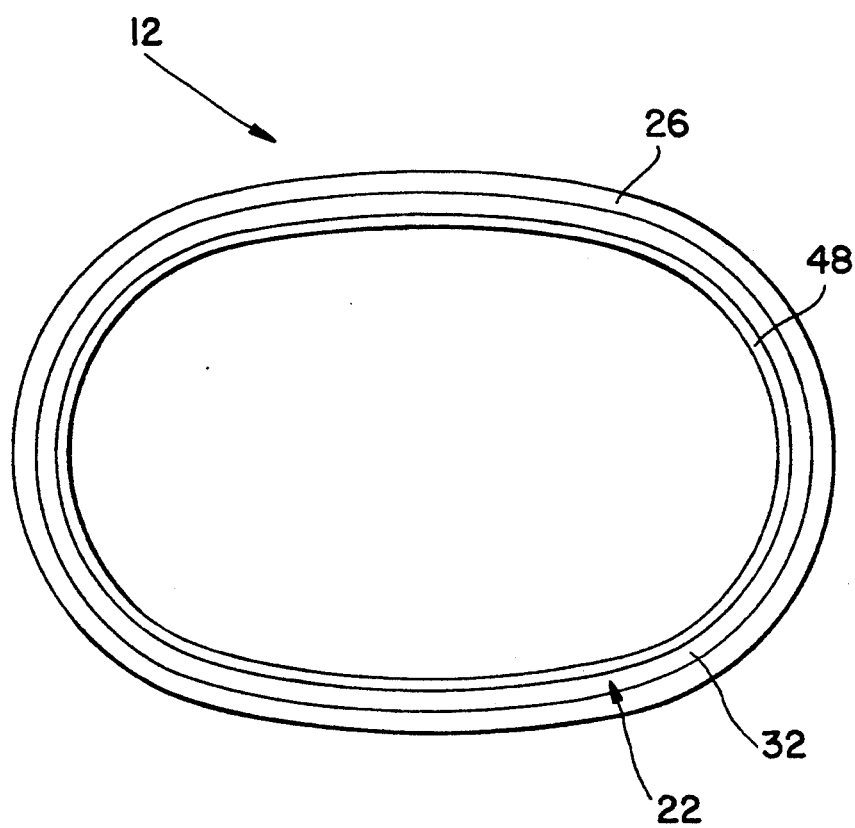
FIG. 1 is an elevational view of the end part of the rigid body of the casing according to the invention.
Figure 2:
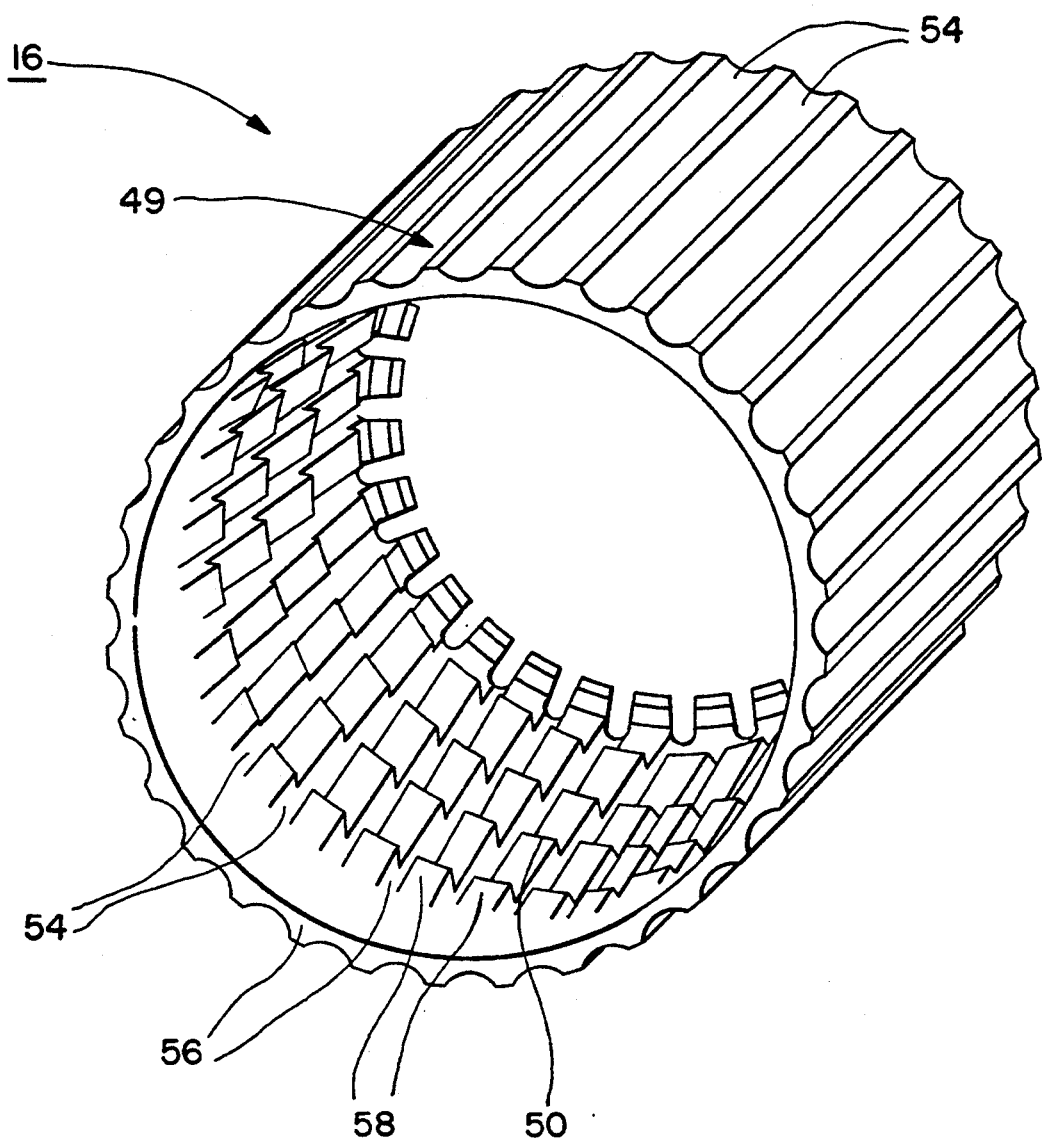
FIG. 2 shows a rear perspective view of the fixing ring.

In FIGS. 1 to 7, a casing 10 made of molded plastic material presents a revolution shape having an oval or ellipsoid cross section, and comprises a hollow body 12 assembled to a closing cover 14 by means of a fixing ring 16.

The rigid body 12 comprises a back panel 18 and a side wall 20 of revolution provided with an end part 22 cooperating with a base part 24 of the cover 14. The external surface of the side wall 20 is equipped with a male first thread 26 and a continuous boss 28 which are staggered along the longitudinal axis 30 between the open end part 22 and the back panel 18. The end part 22 comprises a shoulder 32 receiving a seal 34.

Figure 7:
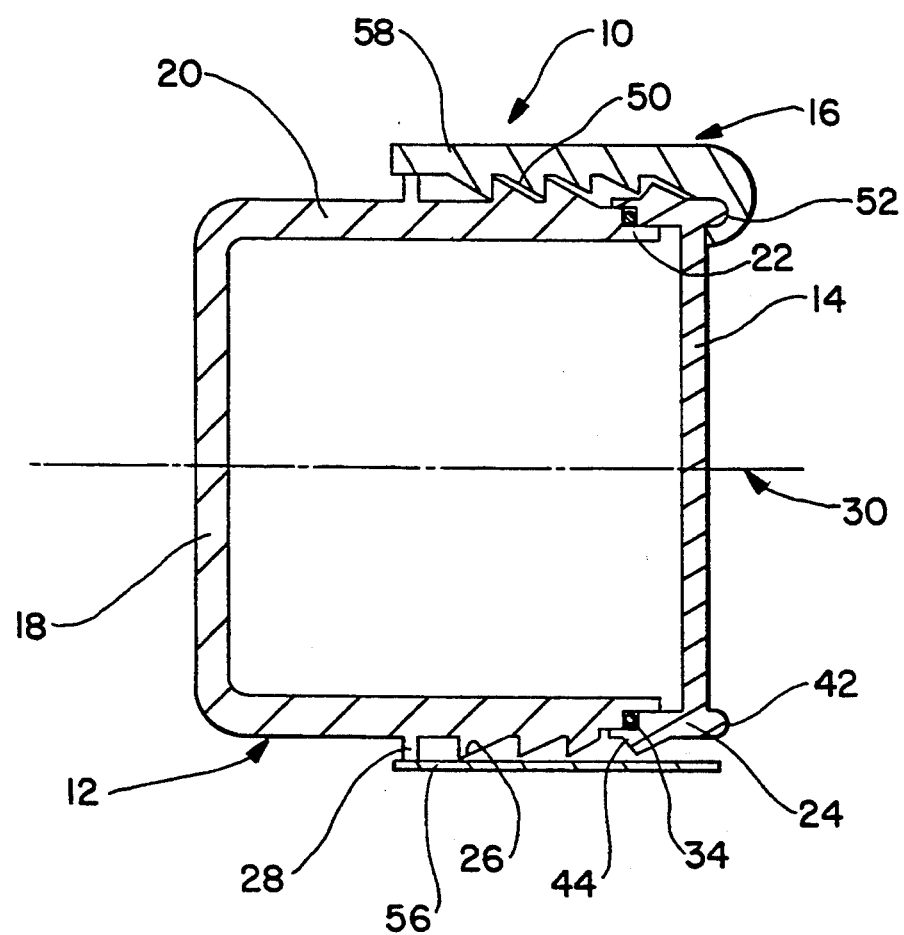
FIG. 7 is a cross-sectional view along the line 7-7 of FIG. 4, representing the casing in the assembled position.

The cover 14 is rigid and extends perpendicularly to the longitudinal axis 30 with the base part 24 coming into engagement against the end part 22 with the seal 34 interposed. The rear part of the base part 24 comprises a bearing edge 36 coming into contact with the seal 34, the edge 36 being located between an overlapping tab 38 and an internal centering surface 40. The front part of the base part 24 is provided with a protrusion 42 acting as a stop for the ring 16 in the assembled position of the casing 10 (FIG. 7). The external lateral surface of the base part 24 comprises a male second thread 44 arranged longitudinally between the tab 38 and protrusion 42.

The mean perimeter of the first thread 26 of the body 12 is slightly greater than that of the second thread 44 of the base part 24.

The shape of the cover 14 follows the outline of the end part 22 exactly due to the cooperation of the tab 38 and the internal surface 40 of the base part 24 with conjugate positioning faces 46, 48 bounding the shoulder 32 of the end part 22.

Figure 3:
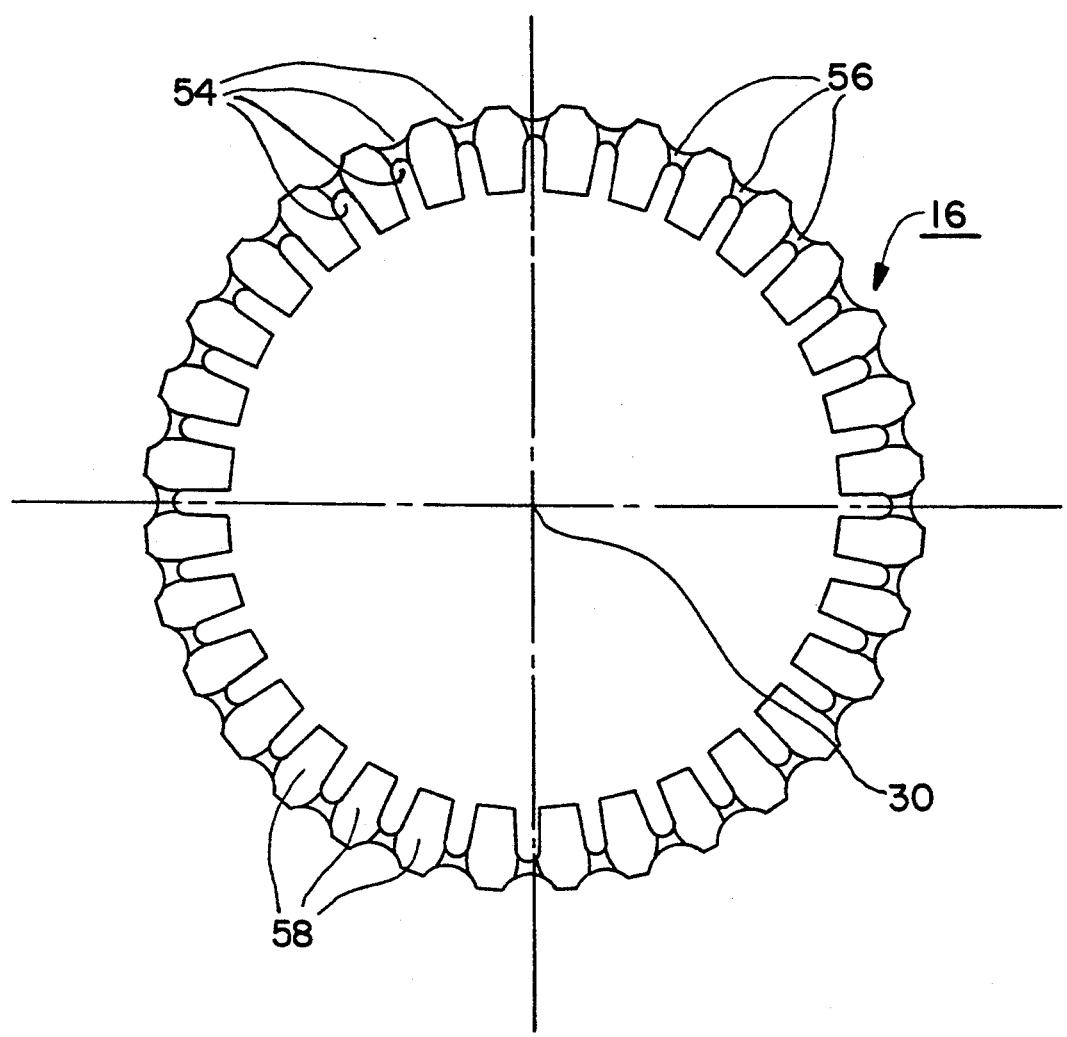
FIG. 3 is an elevational view of the ring coming from casting.

The fixing ring 16 is formed by a flexible plastic part 49 made by injection and having a cylindrical initial shape (FIG. 3). The internal wall of the ring 16 is provided with a female third thread 50 designed to cooperate with the first and second threads 26, 44 when the tightening or loosening operations of the fixing ring 16 are performed. The mean perimeter of the male first thread 26 of the body 12 and of the female third thread 50 of the ring 16 is appreciably identical. The front part of the ring 16 is curved and presents a semi-open notch 52 designed to cover the protrusion 42 of the base part 24 at the end of tightening travel of the ring 16 (FIG. 7). The internal or external wall of the ring 16 comprises a plurality of parallel serrations 54 (FIG. 2), extending parallel to one another in a direction transverse to the third thread 50, in such a way as to define a first series of zones 56 with reduced sections, angularly imbricated between a second series of zones 58 with rigid sections. The presence of the serrations 54 allows an elastic deformation of the ring 16 to make it fit the oval shape of the casing 10 when the third thread 50 is screwed onto the second thread 44 of the cover 14, and onto the first thread 26 of the body 12.

The rear part of the ring 16 comprises a smooth internal surface cooperating with the boss 28 of the body 12 at the end of the tightening travel of the ring 16 (FIG. 7) to ensure rear centering of the ring 16 and to prevent any foreign bodies from getting into the threads 50, 26.

Figure 4:
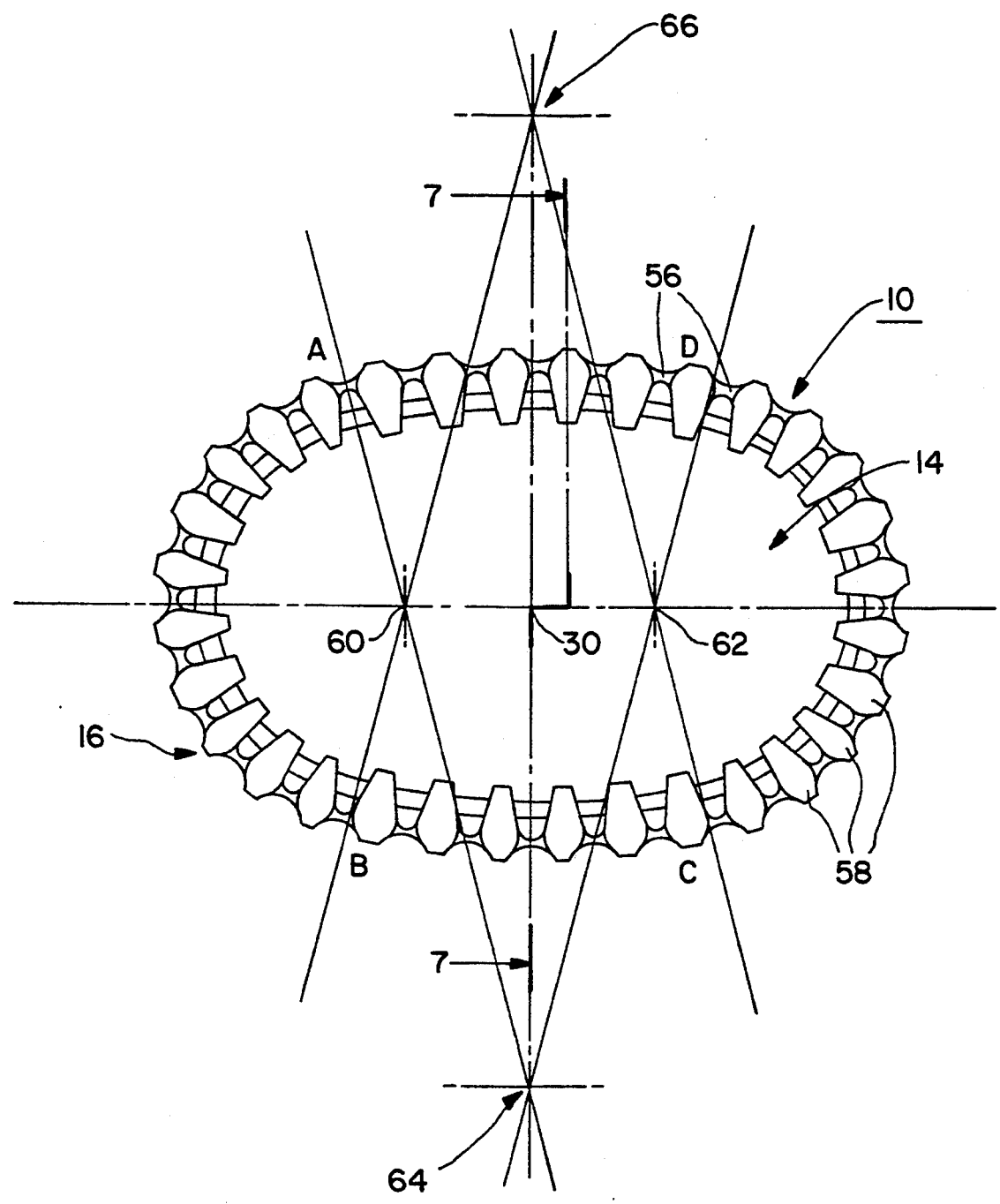
FIG. 4 is an elevational view of the casing after the cover and fixing ring have been fitted.

Assembly and disassembly of the casing 10 is performed as follows :

For the assembly operation, the base part 24 of the cover 14 bears on the end part 22 of the body 12, and the cylindrical ring 16, after it has been deformed, is screwed onto the two respective threads 44, 26 of the base part 24 and body 12 to obtain the oval shape in FIG. 4. The ring 16 fits the oval shape of the body 12 exactly, and provides clamping of the cover 14 against the end part 22 at the end of the tightening travel (FIG. 7). The presence of the seal 34 between the shoulder 32 of the end part 22 and the edge 36 of the base part 24 forms a static sealing between the body 12 and cover 14.

Centering of the cover 14 with respect to the body 12 is achieved by the internal surface 40 and the tab 38 of the base part 24 coming into contact respectively with the external bearing faces 48, 46 of the end part 22.

At the end of the tightening travel of the ring 16 (FIG. 7), the notch 52 bears against the protrusion 42 of the base part 24, and the male second thread 44 of the base part 24 is in the last notch of the female third thread 50 close to the front part of the ring 16.

Figure 5:
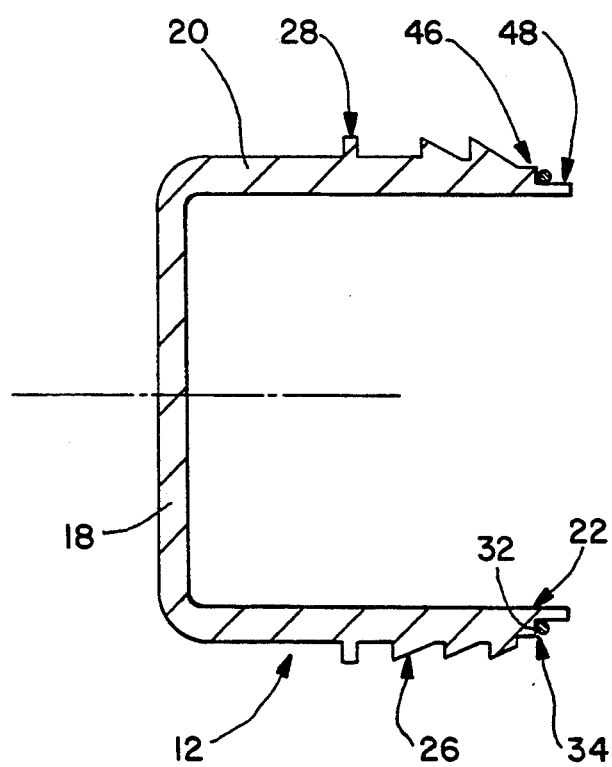
FIGS. 5 and 6 represent a cross-sectional view of the casing in the disassembled position of the cover, after the ring has been unscrewed.
Figure 6:
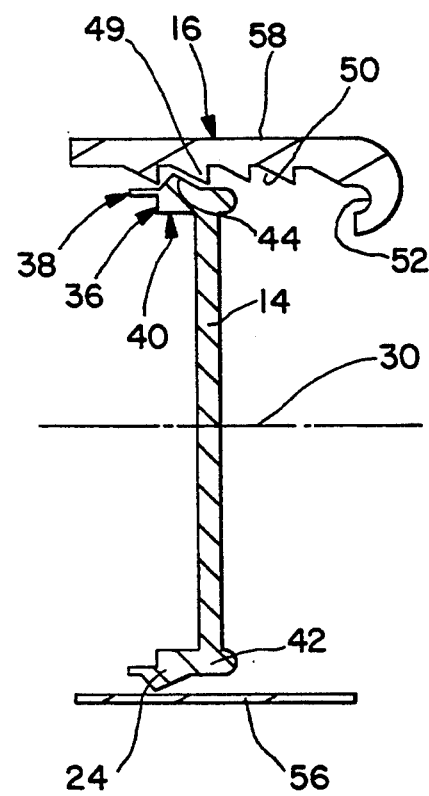

For the disassembly operation of the cover 14, the fixing ring 16 is completely unscrewed to detach the cover 14 from the body 12 (FIGS. 5 and 6). The cover 14 however remains imprisoned by the ring 16, since the male second thread 44 of the base part 24 is housed with clearance in the first notch of the female third thread 50.

The oval shape of the ring 16 (FIG. 4) in the assembled position of the casing 10 comprises a first pair of opposite circular portions AB, CD centered on two internal focusing points 60, 62, and a second pair of portions AD, BC centered respectively on two external axes 64, 66 located symmetrically with respect to the longitudinal axis 30. The axes 64, 66 and the two focusing points 60, 62 are located at the apexes of a parallelogram.

Figure 8:
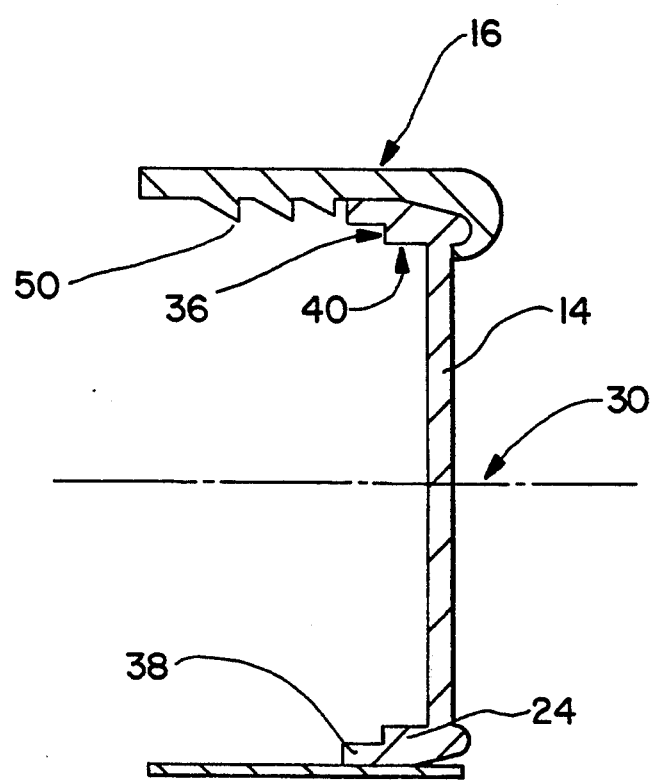
FIG. 8 is an identical view to FIG. 6 of an alternative embodiment of the cover and ring assembly.
Figure 9:
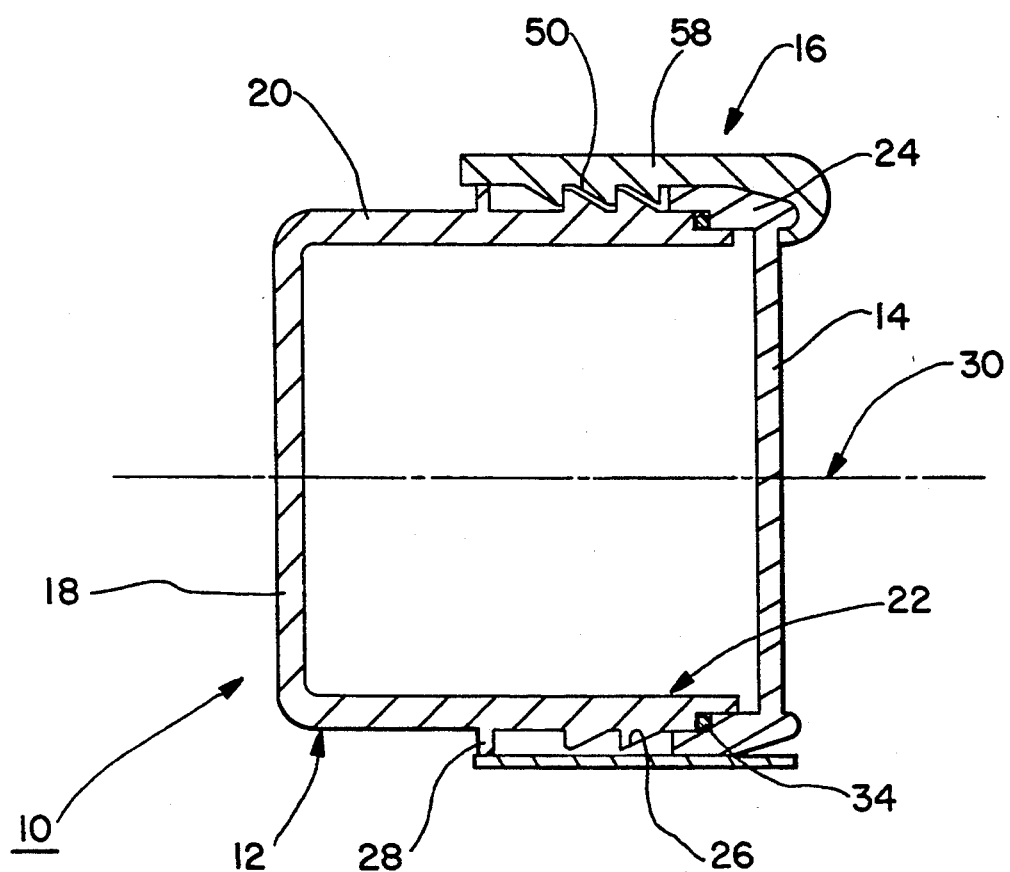
FIG. 9 is an identical view to FIG. 7 with the assembly of FIG. 8.

With reference to FIGS. 8 and 9, the base part 24 is not provided with the male second thread 44, and the tab 38 has a larger cross-section than that of FIGS. 1 to 7.

The cover 14 is fitted by being clipped onto the ring 16 in which the last thread of the thread 50 seats the tab 38. The cover is thus retained in the ring 16 when the ring 16 is unscrewed.

Figure 10:
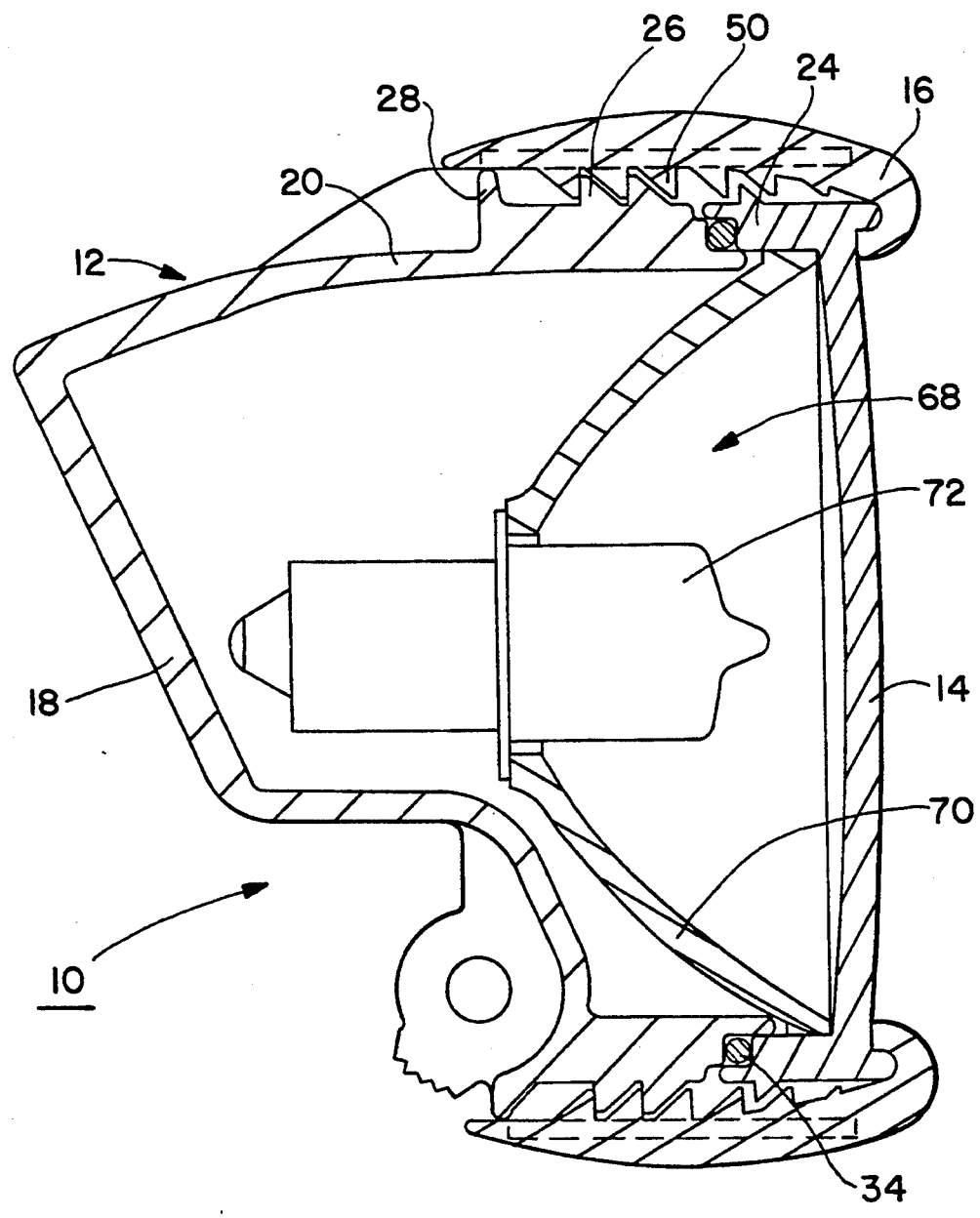
FIG. 10 shows a cross-sectional view of a lighting lamp, having a casing according to FIG. 7.

According to FIG. 10, the casing 10 acts as housing for a lighting lamp 68. The cover 14 is formed by a transparent screen, and the base part 24 bears a parabolic reflector 70, through the center part of which a bulb holder 72 passes.

The oval shape of the casing 10 advantageously enables a pair of reflectors with two bulb holders to be incorporated near the two focusing points 60, 62. A lamp with double focusing is thus obtained.

According to another alternative embodiment, the casing 10 can be used for housing electrical batteries or cells.

The casing 10 can be of any other non-circular shape.

I claim:

1. A casing made of molded plastic material comprising:
   a rigid hollow body having a back panel and a side wall with a surface of revolution equipped with an end part located opposite said back panel, said side wall having an external surface and an inner surface,
   a closing cover coming into engagement against said end part,
   said side wall defining a male thread arranged along said external surface of said side wall,
   a flexible fixing ring having an internal female thread designed to be screwed onto said male thread to ensure that said closing cover is held stably against said end part, said female thread having a last notch close to a front part of said flexible fixing ring,
   said end part, having a non-circular sectional configuration,
   said closing cover having a base part with a sectional configuration appreciably the same as that of said end part,
   said base part having fixing means for inserting said base part into said last notch of said female thread,
   said flexible fixing ring having serration means arranged internally of said flexible fixing ring so as to define a series of hinges allowing elastic deformation of said flexible fixing ring to make the shape of said female thread fit that of said male thread of said rigid hollow body.

2. The casing according to claim 1, used for housing at least one lighting lamp, wherein said closing cover is a transparent screen, and including at least one reflector means supported on said base part of said screen, and at least one bulb holder means extending axially through said reflector means in a direction perpendicularly to said screen.

3. The casing according to claim 1, wherein said flexible fixing ring is an oval shape comprises a pair of opposite circular portions AB, CD centered on first and second internal focusing points, and a second pair of portions AD, BC centered on first and second external axes located symmetrically with respect to the longitudinal axis of the casing, whereby said first and second focusing points together with said first and second axis are located at the apexes of a parallelogram.

4. The casing according to claim 1, including a seal means and wherein:

said rigid hollow body defines a shoulder located on said end part of said rigid hollow body for receiving said seal means, said closing cover defining a bearing edge arranged on said base part of said closing cover coming into contact with said seal means, whereby said bearing edge is located between an outer overlapping tab on said base part and an internal centering surface on said end part cooperating respectively with conjugate positioning faces bounding said shoulder.

5. The casing according to claim 1, wherein said side wall defines a peripheral boss fixedly secured to the external surface of said side wall, said boss cooperating with a rear part of said flexible fixing ring, when said flexible fixing ring is tightly secured to said body, so as to perform rear centering of said flexible fixing ring, and to prevent any foreign bodies from getting into said male and female threads.

6. The casing according to claim 1, wherein a front part of said base part defines a protrusion acting as a stop for said flexible fixing ring in an assembled position of said casing.

7. The casing according to claim 6, wherein said flexible fixing ring is curved defining a semi-open notch of conjugate shape to said protrusion of said base part.

8. A casing made of molded plastic material comprising:

a rigid hollow body having a back panel and a side wall with a surface of revolution equipped with an end part located opposite the back panel, said side wall having an external surface and an inner surface, a closing cover for engagement with said end part, said side wall defining a male first thread arranged along said external surface of said side wall, a flexible fixing ring made by plastic injection of a flexible part having a cylindrical initial shape and having an internal female third thread designed to be screwed onto said male first thread to ensure that said closing cover is held stably against said end part, said female third thread having a last notch close to a front part of said flexible fixing ring, said end part having a non-circular sectional configuration, said closing cover having a base part with a sectional configuration appreciably the same as that of said end part, said flexible fixing ring defining internal serration means so as to define a series of hinges allowing an elastic deformation of said flexible fixing ring to make the shape of said female third thread fit that of said male first thread of said rigid hollow body, and said base part having a male second thread located on an external lateral surface of said base part, and said male second thread cooperating with said last notch of said female third thread, so as to achieve captive assembly of said closing cover on said flexible fixing ring when unscrewing of said flexible fixing ring is performed.

9. The casing according to claim 8, wherein a mean perimeter of said male first thread and said female third thread is slightly greater than that of said male second thread, whereby said base part of said closing cover is assembled with clearance from said female third thread of said flexible fixing ring.

* * * * *